(12) United States Patent
Lipson

(10) Patent No.: US 8,442,219 B2
(45) Date of Patent: May 14, 2013

(54) PUBLIC KEY CRYPTOGRAPHIC METHODS AND SYSTEMS

(76) Inventor: Jesse Lipson, Raleigh, NC (US)

( * ) Notice: Subject to any disclaimer, the term of this patent is extended or adjusted under 35 U.S.C. 154(b) by 1510 days.

(21) Appl. No.: 10/814,726

(22) Filed: Mar. 31, 2004

(65) Prior Publication Data

US 2005/0220299 A1 Oct. 6, 2005

(51) Int. Cl.
*H04L 9/28* (2006.01)

(52) U.S. Cl.
USPC .......................................... 380/30; 380/277

(58) Field of Classification Search ........................ None
See application file for complete search history.

(56) References Cited

U.S. PATENT DOCUMENTS

| | | | |
|---|---|---|---|
| 4,405,829 A | 9/1983 | Rivest et al. | |
| 5,848,159 A | 12/1998 | Collins et al. | |
| 5,987,131 A * | 11/1999 | Clapp | 713/171 |
| 6,073,234 A * | 6/2000 | Kigo et al. | 713/161 |
| 6,091,819 A * | 7/2000 | Venkatesan et al. | 380/28 |
| 6,396,926 B1 * | 5/2002 | Takagi et al. | 380/28 |
| 6,748,410 B1 * | 6/2004 | Gressel et al. | 708/491 |
| 6,772,184 B2 * | 8/2004 | Chang | 708/491 |
| 7,221,757 B2 * | 5/2007 | Alao | 380/37 |
| 7,248,692 B2 * | 7/2007 | Seifert | 380/44 |
| 7,848,516 B2 * | 12/2010 | Lee | 380/30 |
| 7,853,018 B2 * | 12/2010 | Atallah et al. | 380/277 |
| 2002/0064278 A1 | 5/2002 | Lim et al. | |
| 2006/0251248 A1 * | 11/2006 | Lipson | 380/44 |
| 2008/0019508 A1 * | 1/2008 | Lipson | 380/30 |
| 2010/0008496 A1 * | 1/2010 | Gentry | 380/28 |

OTHER PUBLICATIONS

"Efficiency Comparison of Several RSA Variants", Camille Vuillaume, Studienarbeit, Fachbereich Informatik der TU-Darmstadt, WS 2002/2003.

* cited by examiner

*Primary Examiner* — Christopher Revak
(74) *Attorney, Agent, or Firm* — Triangle Patents, PLLC (57) ABSTRACT

Methods are disclosed for improving public key cryptography schemes, such as RSA and its variants, to allow for decryption of messages using less than all of the prime factors of the modulus that is used for encryption of said messages.

32 Claims, 4 Drawing Sheets

PUBLIC KEY CRYPTOGRAPHIC METHODS AND SYSTEMS

BACKGROUND OF THE INVENTION (1) Field of the Invention

The present invention relates generally to cryptography and, more particularly, to public key cryptographic systems such as RSA.

(2) Description of the Prior Art

With the enormous volume of data that is transmitted electronically throughout the world, methods for securing the privacy of that data are crucial to the economy. Before the 1970s, senders and recipients would need to agree on some sort of secret key in order to encrypt messages such that they could not be deciphered by unauthorized third parties but could still be read by the intended recipient. This sort of symmetric cryptography alone is inconvenient in the Internet age, where it is not always easy to arrange a meeting to exchange a secret password that will allow for future secure communications. Fortunately, public key cryptography was developed in the last few decades by Diffie, Hellman, Rivest, Shamir, and Adelman, among others.

Public key cryptography allows for the secure exchange of information between senders and recipients without the necessity that the two parties first exchange a secret key. The recipient simply makes his public key available, which can be used by anyone to encrypt a message to him. Once a message is encrypted using the recipient's public key, only the private key can be used to restore the message to its original state. Only the recipient knows his private key, so messages encrypted with the public key are secure.

The standard methods for public key cryptography were developed by Rivest, Shamir, and Adelman (RSA), described in U.S. Pat. No. 4,405,829. RSA and its variants provide for encryption of data using a public key and decryption using a private key.

RSA security has been publicly and commercially used for communicating or transmitting information, data, documents, messages, and files; however, it is relatively slow (especially the process of decryption) and computationally intensive. This presents problems in many implementations, including servers that receive a large number of requests and mobile devices that have a small amount of computing resources available to them. The slow speed of RSA is a result of the large numbers required to ensure the security of the algorithm. The RSA scheme capitalizes on the extreme difficulty of factoring a large composite number into its constituent primes.

RSA and CRT RSA

RSA consists of three steps: key generation, encryption, and decryption.

Key Generation

Key generation starts by deciding on an adequate length for what is called the public modulus N. This choice is dictated by the difficulty of factoring N into its prime factors. Right now, N of length 1024 bits is considered a sufficient size to prevent factoring. The bit length of N will continue to go up in the future. Next, two random prime numbers that are each half the length of N, p and q, are generated. Next, a small odd integer, e, is selected such that e is relatively prime to $1\,cm(p-1, q-1)$. In practice, e is usually chosen to be 65537. In this paper, we will refer to e as the public exponent and N as the public modulus. The RSA public key consists of the two integers (e, N).

The private exponent, d, is a multiplicative inverse of $e(mod\,1\,cm(p-1, q-1))$, so that $e*d=1\,mod\,(1\,cm(p-1, q-1))$.

Often, the private key refers to the set of numbers (p,q,d), so d should be referred to as the private exponent rather than as the private key.

Encryption

To encrypt message X using an RSA public key {e, N}, one must first convert X into an integer M using a formatting operation. Encryption of M into ciphertext C is then accomplished by calculating C as the remainder after N is divided into M taken to the power of e. In equation form, $C=M^e\,mod\,N$ where M is an integer greater than $-1$ and less than N, $0 \leq M < N$.

Decryption

To decrypt using the original implementation of RSA, M is obtained by calculating the remainder after N is divided into C taken to the power of d. In equation form, $M=C^d\,mod\,N$. M is then converted back to X by reversing the same formatting operation that was used to obtain M from X originally.

It is standard practice now to use the Chinese Remainder Theorem (CRT) for RSA decryption. Rather than compute $M=C^d\,mod\,N$, one calculates $d_p=d\,mod\,(p-1)$ and $d_q=d\,mod\,(q-1)$. Then, one calculates $M_p=C^{d_p}\,mod\,p$ and $M_q=C^{d_q}\,mod\,q$. Then, one uses CRT to calculate M from $M_p$ and $M_q$. This is about four times as fast as calculating $M=C^d\,mod\,N$ directly. For the remainder of this paper, we will refer to this method of RSA decryption as CRT RSA.

Since CRT RSA, a handful of improvements to the RSA methodology have been made to increase decryption speed. We will touch on each of these methods briefly, with more attention paid to Multi-Prime and Multi-Power RSA, which are more in the field of the present invention.

Multi-Prime RSA

This method is detailed in U.S. Pat. No. 5,848,159. Multi-Prime RSA suggests the use of more than two distinct prime factors to generate the public modulus N, whereas the RSA method traditionally uses only two distinct prime factors. For a modulus N of length 1024 bits, Multi-Prime RSA chooses three prime numbers p, q, r that are each one third the length of N. The encryption process is exactly the same as traditional RSA. The decryption process for Multi-Prime RSA is relevantly similar to that of CRT RSA, except that three or more distinct prime numbers are used instead of two. In Multi-Prime RSA, like in traditional and CRT RSA, all of the distinct prime factors of the modulus N are used for decryption of messages.

Using multiple prime factors for RSA decryption increases the total number of calculations that need to be performed, but each calculation is less intensive since each prime factor is smaller than in the two-prime implementation. The result is a theoretical speedup of $b^2/4$, where b is the number of prime factors used. With N of length 1024 bits and b set to 3 (the current maximum for security reasons), Multi-Prime RSA achieves a theoretical speedup of 2.25 over two-factor CRT RSA methods.

Multi-Power RSA

This method is detailed in U.S. Patent Application 20020064278. This method is similar to the Multi-Prime method, except that the Multi-Prime method assumes that all of the prime numbers that make up the composite number N are distinct numbers. The Multi-Power method assumes that N is made up of more than two prime factors, but that N is only made up of exactly two distinct prime factors. So, if $N=p*q*r$, it is assumed that $p=q$ and therefore $N=p^2r$. Like Multi-Prime RSA, encryption is performed in exactly the same was as traditional RSA. For decryption, Multi-Power RSA is able to capitalize on the fact that there are only two distinct prime numbers. So, only two large modular exponentiation computations are necessary (there are several smaller mathematical operations involved using this technique which are computationally negligible), providing increased efficiency over the Multi-Prime method. In Multi-Power RSA, like Multi-Prime and CRT RSA, all of the distinct prime factors of the modulus N are used for decryption of messages.

The result is a theoretical speedup of $b^3/8$, where b is the number of prime factors used. With N of length 1024 bits and b set to 3 (the current maximum for security reasons), Multi-Power RSA achieves a theoretical speedup of 3.375 over two-factor CRT RSA methods.

Batch RSA

Batch RSA is based on the idea that, in certain situations, two or more decryptions can be performed for the time cost of one. In order for this to work, very small public exponents must be used (such as 3 or 5). Further, the system only works if encryption is performed using different public exponents but the same public modulus. Further discussion of this technique is beyond the scope of this paper, but it is another example of a technique to speed up RSA decryption. With N of length 1024, it speeds up decryption by a factor of 2 or 3. However, there are many practical drawbacks to batch RSA techniques.

Rebalanced RSA

In standard RSA, encryption is much faster than decryption. In many applications, it would be desirable to change this behavior. Rebalanced RSA simply shifts more of the burden to the encryption process by increasing the size of the public exponent e (which is usually set to 65537), and tries to decrease the size of the private exponents as much as possible without creating security problems. Rebalanced RSA can be used in conjunction with many of the other methods here, such as Multi-Prime or Multi-Power RSA.

Hardware

There are also hardware approaches to speeding up RSA decryption. These methods consist of designing special processors or other hardware that is designed specifically for the type of modular arithmetic operations that RSA requires. Most hardware methods can be used in conjunction with the algorithmic methods described above.

Despite the existence of several software and hardware implementations for improving the overall speed of the decryption process in public key cryptography, there is still a need for continued improvements to the existing body of work. Faster decryption algorithms provide direct value in many situations, since companies that formerly needed two or three servers to handle decryption may now only need one etc. Given the fact that nearly all secure Internet traffic (SSL) current utilizes public key encryption/decryption, the present invention will provide great utility to the market.

SUMMARY OF THE INVENTION

The present invention discloses methods for improving the computational efficiency and overall capabilities of RSA and related public key cryptographic systems. In prior art, decryption of messages that are encrypted using a public key {e, N} is always achieved using all of the distinct prime factors of N. For example, the private exponent d is usually calculated such that $e*d=1 \mod Z$, where Z is the product of each of the prime factors of N minus 1. In addition, RSA implementations that employ the Chinese Remainder Theorem (CRT) also use each of the distinct prime factors of N as moduli in small modular exponentiations that are combined to perform decryption. The present invention discloses several methods where the prime factors used for decryption are a proper subset of the prime factors in the modulus N, or the prime factors of the modulus used for encryption are a proper superset of the prime factors used for decryption. The techniques proposed in the present invention not only provide for a substantial increase in the computational speed of RSA decryption, but also open the door for exciting new applications of public key cryptography.

Accordingly, one aspect of the present invention is to provide a public key cryptosystem having a predetermined number of prime factors used for the generation of a modulus N and an exponent e, which may be generated in a variety of ways, wherein a proper subset of the prime factors of the modulus N, along with the exponent e, are required to decrypt messages encrypted using the public exponent e and the public modulus N, where e and N are calculated using RSA methods, and encryption occurs using RSA methods.

Another aspect of the present invention is to provide a method for encrypting/decrypting messages including the steps of: providing a public key cryptosystem having a predetermined number of prime factors used for the generation of a modulus N and an exponent e; wherein less than all of the prime factors of the modulus N are required to decrypt messages, documents, files, and/or data capable of being encrypted using the public exponent e and the public modulus N, where e and N are calculated using RSA methods, and encryption occurs using RSA methods.

Yet another aspect of the present invention is to provide a public key cryptosystem where a set of prime numbers S are sufficient for decryption of messages that are encrypted using a modulus $N_p$, calculated as the product of a set of numbers that is a proper superset of S, and a public exponent e, where encryption occurs with standard RSA methods using the e and $N_p$.

Still another aspect of the present invention provides a method for encrypting/decrypting messages where a single prime number, p, and a public exponent e are used to decrypt messages encrypted using a modulus $N_p$, calculated as the product of a set of numbers that is a proper superset of p, and the public exponent e, where encryption occurs with standard RSA methods using e and $N_p$.

Still another aspect of the present invention provides a method for encryption with a public key {e, N} where a plaintext message M is encrypted into a ciphertext message C using any method that produces a value equivalent to $C=M^e \mod (N*X)$, where N is the public modulus and X is any integer greater than 1.

Still another aspect of the present invention provides a method for decryption of a message that has been encrypted with the public key {e, N} where a ciphertext message C is decrypted into a plaintext message M using any method that produces a value equivalent to $M=C^d \mod N_d$, where $N_d$ is the product of less than all of the prime factors of the public modulus N and d satisfies the equation $e*d=1 \mod Z$, where Z is the product of each of the k prime factors of $N_d$ minus 1, $(p_1-1)* \ldots (p_k-1)$.

These and other aspects of the present invention will become apparent to those skilled in the art after a reading of the following description of the preferred embodiment when considered with the claims.

DETAILED DESCRIPTION OF EMBODIMENTS OF THE PRESENT INVENTION

Figure 1:
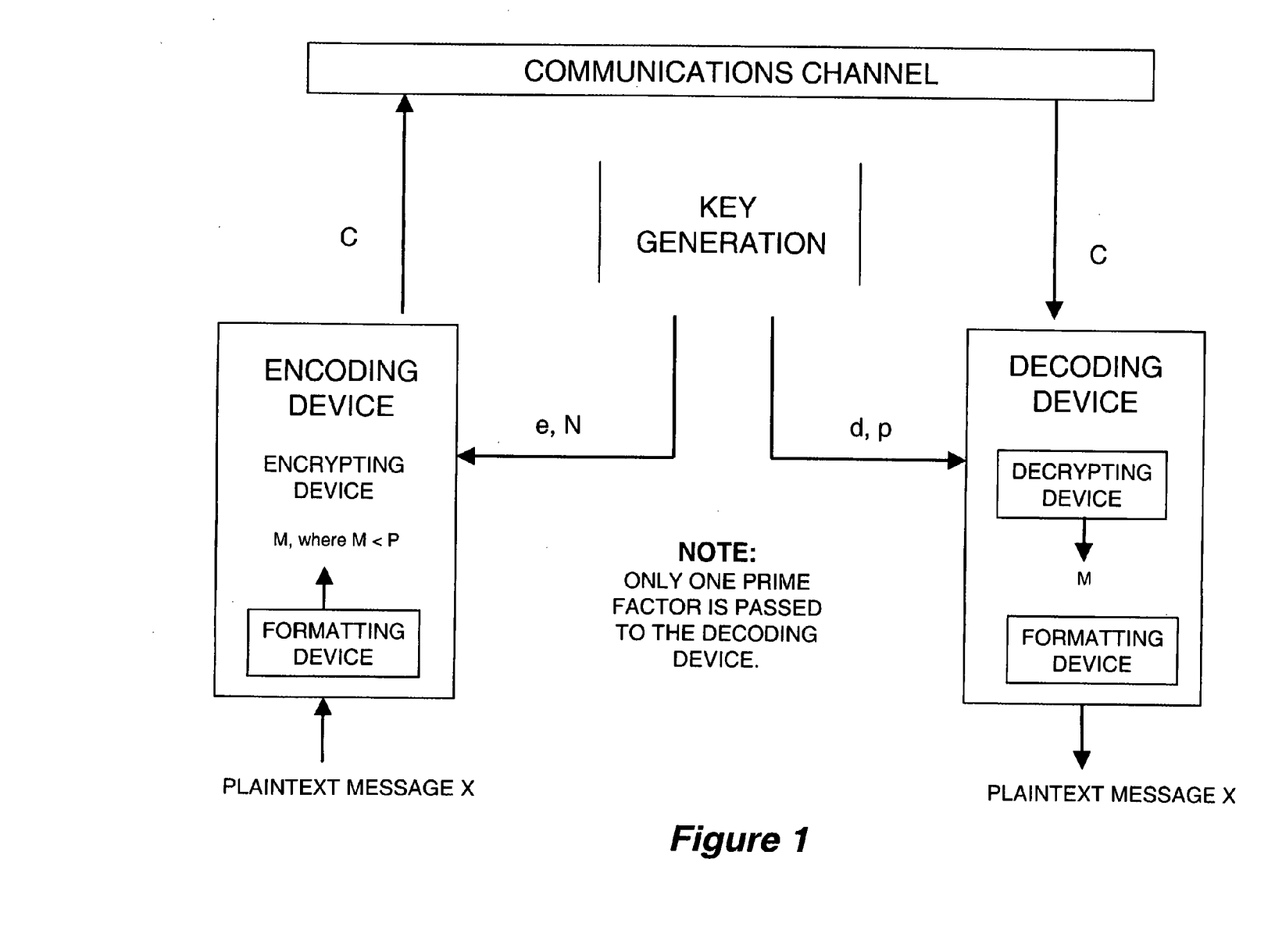
FIG. 1 illustrates a flow diagram showing a method for key generation according to the present invention.
Figure 2:
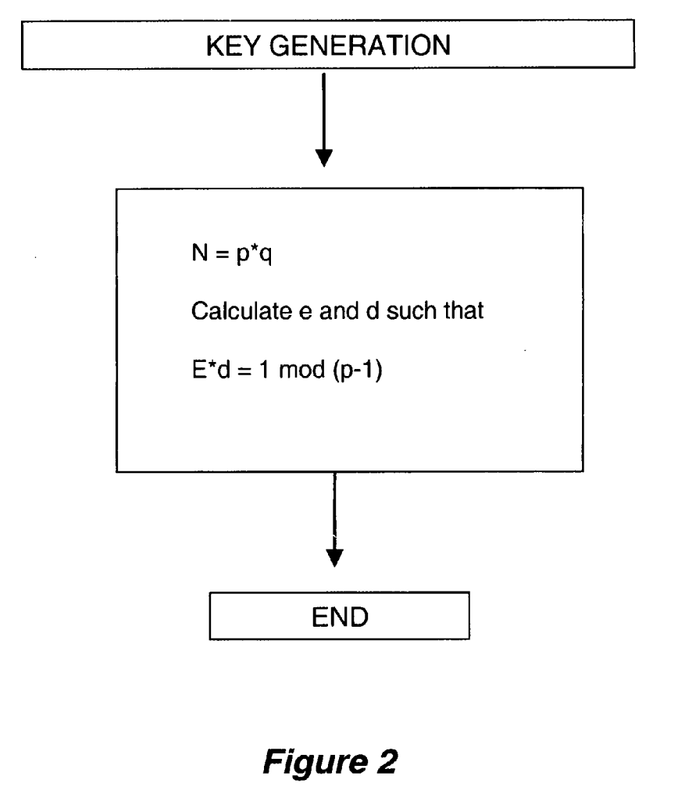
FIG. 2 illustrates a flow diagram showing steps included in a method for key generation according to the present invention.
Figure 3:
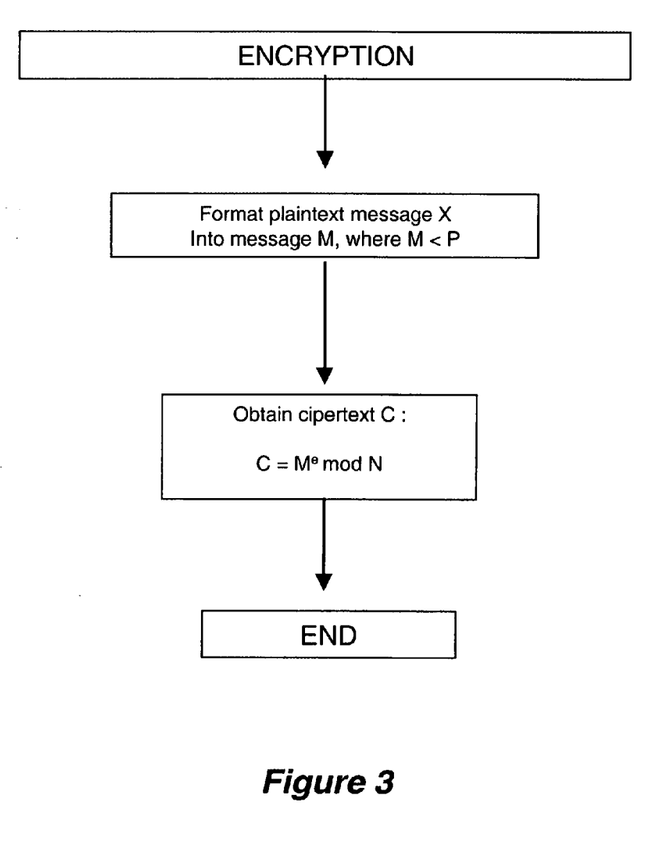
FIG. 3 illustrates a flow diagram showing steps included in a method for encryption according to the present invention.
Figure 4:
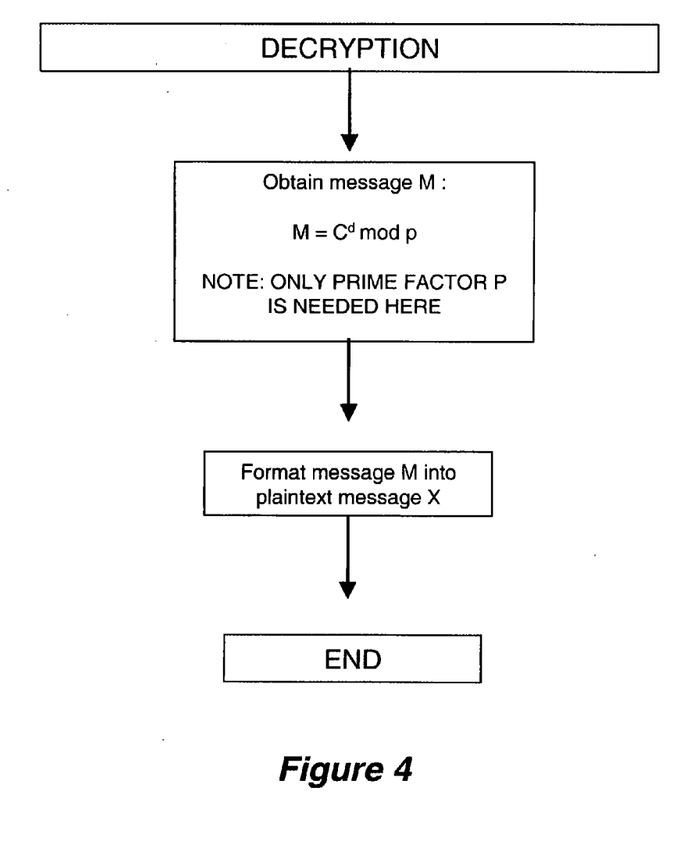
FIG. 4 illustrates a flow diagram showing steps included in a method for decryption according to the present invention.

The following figures are provided to illustrate aspects and/or embodiments of the present invention as described in the specification and are not intended to limit the invention thereto. FIG. 1 illustrates a flow diagram showing a method for key generation according to the present invention, including the encoding and decoding of message X. FIG. 2 illustrates a flow diagram showing steps included in a method for key generation according to the present invention. FIG. 3 illustrates a flow diagram showing steps included in a method for encryption according to the present invention. FIG. 4 illustrates a flow diagram showing steps included in a method for decryption according to the present invention.

For the present invention, the term messages is defined and used herein to include information, documents, files, and/or data that are preferably, but not necessarily, in electronic form.

The present invention provides a system for encrypting and/or decrypting messages, preferably electronic messages, including a public key cryptosystem where decryption is performed using less than all of the prime factors of the modulus used for encryption, along with the public exponent e.

One embodiment of the present invention provides a method for encrypting/decrypting messages including the steps of: providing a public key cryptosystem having a predetermined number of prime factors used for the generation of a modulus N and an exponent e; wherein less than all of the prime factors of the modulus N are required to decrypt messages capable of being encrypted using the public exponent e and the public modulus N, where e and N are calculated using RSA methods, and encryption occurs using RSA methods.

Another embodiment provides a method for encrypting/decrypting messages including the steps of:

Encrypting a plaintext message M into a ciphertext message C using any method that produces a value equivalent to $C = M^e \mod N$, where $0 \leq M < N_d$, such that the ciphertext C can be decrypted into the plaintext message M using only e and the prime factors of $N_d$ N being the product of all of the numbers in the set S;

S being a set of at least two prime numbers, $p_1 \ldots p_k$, where k is an integer greater than 1;

e preferably being a small prime number, alternatively e being a number that is relatively prime to the product of each distinct prime factor of N minus 1, $(N_1-1)^* \ldots (N_j-1)$ for distinct prime factors of N 1 to j, where j is the number of distinct prime factors in N;

$S_d$ being a proper subset of S;

$N_d$ being the product of all of the numbers in the set $S_d$.

Preferably, a method for decrypting encrypted messages comprising the steps of:

determining if a derived modulus $N_d$ is a squarefree number, meaning that its prime decomposition contains no repeated factors, and if so, decrypting ciphertext C into message M using any method that produces a value equivalent to $M = C^d \mod N_d$, where d is generated using the following steps:

Calculating the number $Z_d$ as the product of each prime factor of $N_d$ minus 1, $(N_{d1}-1)^* \ldots (N_{dj}-1)$ for prime factors of $N_d$ 1 to j, where j is the number of prime factors in $N_d$;

generating the exponent d such that the following relationship is satisfied: $e^*d = 1 \mod Z_d$.

In one embodiment, the plaintext message M is restored by directly calculating $M = C^d \mod N_d$.

In another embodiment, M is restored using the steps of:

calculating separate decryption exponents $d_{nd1} \ldots d_{ndj}$ for all prime factors of $N_d$ 1 to j, where j is the number of prime factors in $N_d$ so that the following relationship is satisfied for each member of $N_d$: $e^*d_{ndi} = 1 \mod (N_{di}-1)$; and performing decryptions of the form $M_i = C^{d_{ndi}} \mod N_{di}$ for all prime factors of $N_d$ from 1 to j, where j is the number of prime factors in $N_d$, and then using the values of each $M_i$ and N to reconstruct M. These steps for reconstructing M from each value of $M_i$ and $N_{di}$ are preferably performed using the Chinese Remainder Theorem and/or Garner's algorithm, such as set forth in the references C. Vuillame *Efficiency Comparison of Several RSA Variants*, which are incorporated herein by reference in their entirety.

Alternatively, a method for decrypting encrypted messages including the steps of: decrypting the ciphertext message C to the plaintext message M by determining if the derived modulus $N_d$ is squarefull number, meaning that its prime decomposition contains at least one square, and if so;

calculating separate decryption exponents $d_{nd1} \ldots d_{ndj}$ for all distinct prime factors of $N_d$ 1 to j, where j is the number of distinct prime factors in $N_d$ so that the following relationship is satisfied for each distinct member of $N_d$: $e^*d_{ndi} = 1 \mod (N_{di}-1)$; for each distinct prime factor of $N_d$, $N_{di}$, calculating a value $b_{di}$ as the number of times that $N_{di}$ occurs as a prime factor in $N_d$;

calculating $M_i$ for each distinct prime factor of $N_d$, $N_{di}$;

and using all values of $M_i$, $N_{di}$, $d_{ndi}$, and $b_{di}$ to restore the plaintext message M. The method of calculating $M_i$ for each distinct prime factor of $N_d$, $N_{di}$ is preferably performed using Hensel Lifting, such as set forth in the references C. Vuillame *Efficiency Comparison of Several RSA Variants*, which are incorporated herein by reference in their entirety. The restoration of the plaintext message M from the values of $M_i$, $N_{di}$, $d_{ndi}$, and $b_{di}$ is preferably performed using techniques such as the Chinese Remainder Theorem and/or Garner's algorithm.

Another embodiment of the present invention includes a method for encrypting/decrypting messages, including the steps of:

Encrypting a plaintext message M into a ciphertext message C using any method that produces a value equivalent to $C = M^e \mod N_p$, where $0 \leq M < N$, such that the ciphertext C can be decrypted into the plaintext message M using e and the prime factors of N N being the product of all of the numbers in the set S;

S being a set of at least one prime number, $p_1 \ldots p_k$, where k is an integer greater than 0;

$S_p$ being a proper superset of S;

$N_p$ being the product of all of the numbers in the set $S_p$;

e preferably being a small prime number, or alternatively, e being a number that is relatively prime to the product of each distinct prime factor of $N_p$ minus 1, $(N_{p1}-1)^* \ldots (N_{pj}-1)$ for distinct prime factors of $N_p$ 1 to j, where j is the number of distinct prime factors in $N_p$;

Preferably, a method for decrypting encrypted messages including the steps of:

Decrypting the ciphertext message C into the plaintext message M by determining if the modulus N is a square free number; and if so then, decrypting ciphertext C into message M using any method that produces a value equivalent to $M = C^d \mod N$, where d is generated using the following steps:

Calculating the number Z as the product of each prime factor of N minus 1, $(N_1-1)* \ldots (N_j-1)$ for prime factors of N 1 to j, where j is the number of prime factors in N;

then generating the decryption exponent d such that the following relationship is satisfied: $e*d=1 \mod Z$;

In one embodiment, M is directly calculated as $M=C^d \mod N$.

In an alternative embodiment, M is calculated including the steps of:

calculating separate decryption exponents $d_1 \ldots d_j$ for all prime factors of N 1 to j, where j is the number of prime factors in N so that the following relationship is satisfied for each member of N: $e*d_i=1 \mod (N_i-1)$; and performing decryptions of the form $M_i=C^{d_i} \mod N_i$ for all prime factors of N from 1 to j, where j is the number of prime factors in N. Next, the values of each $M_i$ and $N_i$ are used to reconstruct M, preferably using the Chinese Remainder Theorem and/or Garner's algorithm.

Alternatively, a method for decrypting encrypted messages comprises the steps of:

Decrypting the ciphertext message C to the plaintext message M by determining if the derived modulus N is squareful number; if so then, calculating separate decryption exponents $d_{n1} \ldots d_{nj}$ for all distinct prime factors of N 1 to j, where j is the number of distinct prime factors in N so that the following relationship is satisfied for each distinct member of N: $e*d_{ni}=1 \mod (N_i-1)$;

for each distinct prime factor of N, $N_i$, calculating a value $b_i$ as the number of times that $N_i$ occurs as a prime factor in N;

Preferably using Hensel Lifting to calculate $M_i$ for each distinct prime factors of N, $N_i$;

and preferably using the Chinese Remainder Theorem and/or Garner's algorithm to use each value of $M_i$, $N_i$, $b_i$ and $d_{ni}$ to restore the plaintext message M;

In still another embodiment of the present invention, encrypting/decrypting messages including the steps of:

Encrypting a plaintext message M into a ciphertext message C using any method that produces a value equivalent to $C=M^e \mod N_p$, where $0 \leq M < N$ such that the ciphertext C can be decrypted into the plaintext message M using e and the prime factors of N N being the product of all of the members of set S;

S being a set of at least two numbers, $p_1 \ldots p_k$ where k is an integer greater than 1 and all members of S are equal to $p_s$, which is a prime number;

$S_p$ being a superset of S;

$N_p$ being the product of all of the numbers in the set $S_p$;

e preferably being a small prime number, or alternatively, e being a number that is relatively prime to the product of all of the distinct prime factors of $N_p$ minus 1, $(N_{p1}-1)* \ldots (N_{pj}-1)$ for distinct prime factors of $N_p$ 1 to j, where j is the number of distinct prime factors in $N_p$;

Preferably, decryption of encrypted messages includes the steps of:

Decrypting the ciphertext message C to the plaintext message M by:

Calculating b as the number of times that the number $p_s$ occurs as a prime factor in N;

Generating an exponent d such that the following equation is satisfied:

$$e*d=1 \mod (p_s-1);$$

Using Hensel Lifting to transform C into M with d, $p_s$, and b as input values.

In still another embodiment of the present invention, a method for crytographic communications is disclosed, including the steps of:

Encrypting a plaintext message M into a ciphertext message C using any method that produces a value equivalent to $C=M^e \mod N_p$, where $0 \leq M < p$, such that the ciphertext C can be decrypted into the plaintext message M using e and p p being a prime number;

S being a set containing only the number p;

$S_p$ being a superset of S;

$N_p$ being the product of all members of the set $S_p$;

e preferably being a small prime number, or alternatively, e being a number that is relatively prime to the product of each distinct prime factor of $N_p$ minus 1, $(N_{p1}-1)* \ldots (N_{pj}-1)$ for distinct prime factors of $N_p$ 1 to j, where j is the number of distinct prime factors in $N_p$;

Preferably, decryption of encrypted messages comprises the steps of:

Decrypting using any method that produces a value equivalent to as $M=C^d \mod p$, where d is generated using the following step:

Calculating d such that the following equation is satisfied:

$$e*d=1 \mod (p-1);$$

In another embodiment of the present invention, a method for establishing cryptographic communications is disclosed, including the steps of: calculating a composite number N, which is formed from the product of distinct prime numbers S, $p_1 \ldots p_k$ where $k \geq 1$. Encoding a plaintext message M, to a ciphertext message C, where M corresponds to a number representative of a message and $0 \leq M < S$; generating an exponent e, which is preferably a small prime number but can alternatively be established as any number that is relatively prime to the product of each distinct prime factor of N minus 1, $(N_1-1), \ldots (N_j-1)$ for distinct prime factors of N 1 to j, where j is the number of distinct prime factors in N; transforming said plaintext, M, into said ciphertext, C, where C is developed using any method that produces a value equivalent to $C=M^e \mod N$, such that ciphertext C can be decrypted into plaintext M using only e and S.

Decryption of messages encrypted in such a way is performed by: decoding the ciphertext message C to the plaintext message M, wherein said decoding includes the step of: transforming said ciphertext message C to plaintext M, using any method that produces a value equivalent to $M=C^d (\mod S)$, where d is generated such that $e*d=1 \mod (S-1)$;

Another embodiment of the present invention discloses a system for encrypting and decrypting electronic communications including a network of computers and/or computer-type devices, such as personal data assistants (PDAs), mobile phones and other devices, in particular mobile devices capable of communicating on the network; generating at least one private key and at least one public key, wherein the at least one private key is determined based upon any one of a multiplicity of prime numbers that when multiplied together produce N, which is the modulus for at least one of the public keys.

Another embodiment of the present invention discloses a method for public key decryption where less than all of the distinct prime factors of a number N are used to decrypt a ciphertext message C into plaintext message M, where encryption occurs with the public key {e, N} using any method that produces a value equivalent to $C=M^e \mod N$.

Another embodiment of the present invention discloses a method for public key encryption with a public key {e, N} where a plaintext message M is encrypted into a ciphertext message C using any method that produces a value equivalent to $C=M^e \mod (N*X)$, where N is the public modulus and X is any integer greater than 1.

Another embodiment of the present invention discloses a method for public key decryption of a message that has been encrypted with the public key {e, N} where a ciphertext message C is decrypted into a plaintext message M using any method that produces a value equivalent to $M=C^d \mod N_d$, where $N_d$ is the product of less than all of the prime factors of the public modulus N and d satisfies the equation $e*d=1 \mod Z$, where Z is the product of each of the k prime factors of $N_d$ minus 1, $(p_1-1)* \ldots (p_k-1)$.

Yet another embodiment of the present invention discloses a method for public key decryption of a message that has been encrypted using any method that produces a value equivalent to $C=M^e \mod N$, where a ciphertext message C is decrypted into a plaintext message M using any method that produces a value equivalent to $M=C^d \mod N_d$, where $N_d$ is the product of less than all of the prime factors of the public modulus N and d satisfies the equation $e*d=1 \mod Z$, where Z is the product of each of the k prime factors of $N_d$ minus 1, $(p_1-1)* \ldots (p_k-1)$.

Generally, decryption methods according to the present invention are paired with particular encryption steps such that decryption is accomplished using the encryption exponent e and less than all of the prime factors of the encryption modulus, as set forth in the following design examples, which are provided for the purpose of illustrating methods of the present invention, without limiting it expressly thereto.

DESIGN EXAMPLES

Example #1

Generating prime numbers p and q as the members of set S, and calculating $N=p*q$. It is preferred that p is set to the minimum bit length, given existing security constraints and the expected message size, and that q is set to a bit length such that the bit length of N reaches its recommended size.
Calculating e as a small prime number, such as 65537.
Including p as the only member of the proper subset, $S_d$.
Setting $N_d=p$.
Calculating the private exponent d such that $e*d=1 \mod (p-1)$.
Encrypting plaintext M into ciphertext C as $C=M^e \mod N$, where $0 \leq M < N_d$.
Decrypting ciphertext C into plaintext M as $M=C^d \mod N_d$.

Example #2

Generating prime number p as the only member of set S, and setting $N=p$.
It is preferred that p is set to the minimum bit length given existing security constraints and the expected message size.
Calculating e as a small prime number, such as 65537.
Creating the set $S_p$ as a proper superset of set S containing members p and q, and calculating $N_p=pq$. It is preferred that q is large enough so that the bit length of the $N_p$ reaches its recommended size.
Calculating the private exponent d such that $e*d=1 \mod (p-1)$.
Encrypting plaintext M into ciphertext C as $C=M^e \mod N_p$, where $0 \leq M < N$.
Decrypting ciphertext C into plaintext M as $M=C^d \mod N$.

Example #3

Generating prime number p and choosing the members of set S as {p,p}, and setting $N=p^2$.
It is preferred that p is set to the minimum bit length given existing security constraints and expected message size.
Calculating e as a small prime number, such as 65537.
Creating the set $S_p$ as a proper superset of set S containing members {p,p,q}, and calculating $N_p=p^2q$. It is preferred that q is large enough so that the bit length of the $N_p$ reaches its recommended size.
Calculating the private exponent d such that $e*d=1 \mod (p-1)$.
Encrypting plaintext M into ciphertext C as $C=M^e \mod N_p$, where $0 \leq M < N$.
Decrypting ciphertext C into plaintext M by:
Precomputing the value $e\_inv\_p=e^{-1} \mod p$;
Calculating $C_s=C \mod p^2$;
Calculating $M_1=C_s^{d-1} \mod p$;
Calculating $K_0=(M_1*C_s) \mod p$;
Calculating $A=(C-K_0^e) \mod p^2$;
Calculating $M_2=(M_1*A) \mod p^2$;
Calculating $M_3=(M_2*e\_inv\_p) \mod p^2$;
Decoding plaintext message $M=(M_3+K_0) \mod p^2$;

Example #4

Generating distinct prime numbers p and q, and choosing the members of set S as {p,q}, and setting $N=p*q$.
Calculating e as a small prime number, such as 65537.
Creating the set $S_p$ as a proper superset of set S containing members {p,q,r}, and calculating $N_p=pqr$, with q chosen so that that N is a square free number (all prime factors are distinct).
Calculating the private exponent d such that $e*d=1 \mod (p-1)(q-1)$.
Encrypting plaintext M into ciphertext C as $C=M^e \mod N_p$, where $0 \leq M < N_p$.
Decrypting ciphertext C into plaintext M by:
Calculating $M_p=M \mod p$;
Calculating $M_q=M \mod p$;
Calculating $p\_inv\_q=p^{-1} \mod q$;
Calculating $V=(M_q-M_p) \mod q$;
Calculating $V_1=V*p\_inv\_q \mod q$;
Calculating $M_1=V*p \mod N$;
Calculating plaintext $M=(M_1+M_p) \mod N$;

Example #5

Being provided a public key {e, N};
Generating a number X as a large prime number;
Encrypting a plaintext message M into a ciphertext message C as: $C=M^e \mod (N*X)$;
Provided that M<X and M<N, decryption can occur in either of two ways:
$M=C^d \mod N$, using the private key that corresponds to the public key {e, N}
Or
$M=C^{d_x} \mod X$, where $d_x$ is calculated such that $e* d_x=1 \mod (X-1)$ Certain modifications and improvements will occur to those skilled in the art upon a reading of the foregoing description. All modifications and improvements have been deleted herein for the sake of conciseness and readability but are properly within the scope of the following claims.

What is claimed is:
1. A computer-based system for establishing encrypted messages comprising:

at least one computing device having a hardware processor to perform cryptographic operations including generating at least one public key for use in encrypting and/or decrypting messages;

wherein the messages include electronic forms of information, documents, files, data, or any combination thereof;

wherein the public key includes a predetermined number of prime factors used for the generation of a modulus N and an exponent e;

wherein the modulus N is not a squareful number and is the product of the unraised prime factors alone;

wherein a proper subset of the prime factors of the modulus N composed of less than all of the distinct prime factors, along with the exponent e, are required to decrypt messages that are encrypted by the hardware processor using the public exponent e and the public modulus N;

wherein e and N are calculated by the hardware processor using RSA methods; and wherein encryption using the private key occurs using RSA methods.

2. A computer-based method of establishing and utilizing a public key for encryption of at least one message by a computing device having a hardware processor, said method including the steps of:

the hardware processor creating the public key having a predetermined number of distinct prime factors used for the generation of a modulus N and an exponent e;

wherein the modulus N is not a squareful number and is the product of the unraised prime factors alone;

wherein a proper subset of the prime factors of the modulus N composed of less than all of the distinct prime factors are required to decrypt messages that are encrypted using the public exponent e and the public modulus N;

wherein e and N are calculated by the hardware processor using RSA methods;

the hardware processor utilizing the public key to encrypt the at least one message using RSA methods; and wherein the at least one message includes electronic forms of information, documents, files, data, or any combination thereof.

3. A computer-based method for encrypting/decrypting messages in a data communication system in which at least one message is exchanged utilizing a public key, said method performed in a hardware processor of a computing device, said method comprising the steps of:

the hardware processor encrypting a plaintext message M into a ciphertext message C using any method that produces a value equivalent to $C=M^e \mod N$, where $0 \leq M < N_d$, such that the ciphertext C can be decrypted into the plaintext message M using only e and the prime factors of $N_d$;

N being the product of all of the numbers in the set S and is the product of the unraised prime factors alone;

N is not a squareful number;

S being a set of at least two distinct prime numbers, $p_1 \ldots p_k$, where k is an integer greater than 1;

e being a number;

$S_d$ being a proper subset of S composed of less than all of the distinct prime factors in set S; and $N_d$ being the product of all of the numbers in the set $S_d$.

4. The method of claim 3, wherein the step of the hardware processor generating the exponent e includes the hardware processor calculating the exponent e as a number that is relatively prime to the product of each distinct prime factor of N minus 1, $(N_1-1)^* \ldots (N_j-1)$ for distinct prime factors of N 1 to j, where j is the number of distinct prime factors in N, or choosing the exponent e as a small prime number.

5. A computer-based method for decrypting encrypted messages exchanged between a pair of computing devices, both containing hardware processor, and both operating in connection with a data communication network, said method utilizing a public key and comprising the steps of:

the first of said hardware processors encrypting message M utilizing a public key, thereby transforming message M into ciphertext C;

the first of said computing devices transmitting ciphertext C over the data communications network;

the second of said computing devices receiving ciphertext C over the data communications network; and the second of said hardware processors determining if a derived modulus $N_d$ is a squarefree number, and if so, decrypting ciphertext C back into message M using any method that produces a value equivalent to $M=C^d \mod N_d$, where d is generated using the following steps:

calculating the number $Z_d$ as the product of each prime factor of $N_d$ minus 1, $(N_{d1}-1)^* \ldots (N_{dj}-1)$ for distinct prime factors of $N_d$ 1 to j, where j is the number of distinct prime factors in $N_d$; and generating the exponent d such that the following relationship is satisfied: $e^*d=1 \mod Z_d$.

6. The method according to claim 5, further including the step of directly calculating $M=C^d \mod N_d$.

7. The method according to claim 5, further including the steps of:

calculating separate decryption exponents $d_{nd1} \ldots d_{ndj}$ for all prime factors of $N_d$ 1 to j, where j is the number of prime factors in $N_d$ so that the following relationship is satisfied for each member of $N_d: e^*d_{ndi}=1 \mod (N_{di}-1)$; and performing decryptions of the form $M_i=C^{d_{ndi}} \mod N_{di}$ for all prime factors of $N_d$ from 1 to j, where j is the number of prime factors in $N_d$, and then using the values of each $M_i$ and $N_{di}$ to reconstruct M.

8. The method of claim 7, wherein the values of each $M_i$ and $N_{di}$ restore the plaintext message M using the Chinese Remainder Theorem and/or Garner's algorithm.

9. A public key cryptosystem utilizing a network to transmit messages between a pair of computing devices each having a hardware processor;

the first of said hardware processors establishing a public key;

said messages including electronic forms of information, documents, files, data, or any combination thereof;

said messages being decrypted by the second of said hardware processors using a set of prime numbers S and the public exponent e;

said messages being encrypted by the first of said hardware processors using a squarefree modulus $N_p$ that is calculated as the product of a set of unraised distinct numbers alone that is a proper superset of S composed of distinct numbers; and encryption by the first of said hardware processors occurring using standard RSA methods using the public exponent e and the modulus $N_p$.

10. A method for encrypting and/or decrypting at least one messages between two computing units each having a hardware processor, said method being performed on at least one of said hardware processors and said message being transmitted over a network connecting the computing devices, comprising the steps of:

the hardware processor of one computer device encrypting a plaintext message M into a ciphertext message C using any method that produces a value equivalent to $C=M^e \mod N_p$, where $0 \leq M < N$, such that the ciphertext C can be decrypted into the plaintext message M using e and the distinct prime factors of N;

N being the product of all of the unraised numbers alone in the set S;

N is not a squareful number;

S being a set of at least one prime number, $p_1 \ldots p_k$, where k is an integer greater than 0;

$S_p$ being a proper superset of S composed of distinct prime numbers;

$N_p$ being the product of all of the numbers in the set $S_p$; and e being a number.

11. The method of claim 10, wherein the step of generating the exponent e includes calculating the exponent e as a number that is relatively prime to the product of each distinct prime factor of $N_p$ minus 1, $(N_{p1}-1)* \ldots (N_{pj}-1)$ for distinct prime factors of $N_p$ 1 to j, where j is the number of distinct prime factors in $N_p$.

12. The method of claim 10, wherein the step of generating the exponent e includes choosing the exponent e as a small prime number.

13. A computer-based method of decrypting at least one encrypted message transmitted over a network to a computing device having a hardware processor, the hardware processor decrypting the transmitted ciphertext message C into the plaintext message M by including the steps of:
 determining if the modulus N is a squarefree number; and if so then,
 decrypting ciphertext C into message M using any method that produces a value equivalent to $M=C^d \mod N$, where d is generated using the following steps:
 calculating the number Z as the product of each prime factor of N minus 1, $(N_{1-1})* \ldots (N_{j-1})$ for prime factors of N 1 to j, where j is the number of distinct prime factors in N;
 then generating the decryption exponent d such that the following relationship is satisfied: $e*d=1 \mod Z$.

14. The method according to claim 13, further including the step of:
 directly calculating $M=C^d \mod N$.

15. The method according to claim 13, further including the steps of:
 calculating separate decryption exponents $d_1 \ldots d_j$ for all prime factors of N from 1 to j, where j is the number of prime factors in N so that the following relationship is satisfied for each member of N: $e*di=1 \mod (Ni-1)$; and performing decryptions of the form $M_i=C^{di} \mod N_i$, for all prime factors of N from 1 to j, where j is the number of prime factors in N, and then using the values of each $M_i$ and $N_i$ to reconstruct M.

16. The method of claim 15, wherein the values of each $M_i$ and $N_i$ reconstruct M using the Chinese Remainder Theorem and/or Garner's algorithm.

17. A computer-based method for encrypting and/or decrypting messages transmitted over a network between at least two computing devices each having a hardware processor comprising the steps of:
 the first of the hardware processors encrypting a plaintext message M into a ciphertext message C using any method that produces a value equivalent to $C=M^e \mod N_p$, where $0 \leq M<N$, such that the ciphertext C can be decrypted by the second of the hardware processors into the plaintext message M using e and the prime factors of N;
 N being the product of all of the unraised members alone of set S;
 N not being a squareful number;
 S being a set of at least two numbers, $p_1 \ldots p_k$ where k is an integer greater than 1 and all members of S are equal to $p_s$, which is a prime number;
 $S_p$ being a superset of S composed of distinct prime numbers;
 $N_p$ being the product of all of the numbers in the set $S_p$; and
 e being a number.

18. The method of claim 17, wherein the step of generating the exponent e further includes: calculating the exponent e as a number that is relatively prime to the product of all of the distinct prime factors of $N_p$ minus 1, $(N_{p1}-1)* \ldots (N_{pj}-1)$ for distinct prime factors of $N_p$ 1 to j, where j is the number of distinct prime factors in $N_p$.

19. The method of claim 17, wherein the step of generating the exponent e includes choosing the exponent e as a small prime number.

20. A computer-based method for encrypting/decrypting messages transmitted over a data communication network utilizing at least two computing devices each having a hardware processor comprising the steps of:
 the first of the hardware processors encrypting a plaintext message M into a ciphertext message C using any method that produces a value equivalent to $C=M^e \mod N_p$, where $0 \leq M<p$, such that the ciphertext C can be decrypted by the second of the hardware processors into the plaintext message M using e and p;
 p being a prime number;
 S being a set containing only the number p;
 $S_p$ being a superset of S consisting of distinct prime numbers;
 $N_p$ being the product of all unraised members alone of the set Sp;
 $N_p$ is not a squareful number; and
 e being a number.

21. The method of claim 20, wherein the step of generating the exponent e further includes: Calculating the exponent e as a number that is relatively prime to the product of each distinct prime factor of $N_p$ minus 1, $(N_{p1}-1)* \ldots (N_{pj}-1)$ for distinct prime factors of $N_p$ 1 to j, where j is the number of distinct prime factors in $N_p$.

22. The method of claim 20, wherein the step of generating the exponent e includes choosing the exponent e as a small prime number.

23. A computer-based method for decrypting encrypted messages transmitted over a data communication system utilizing at least one hardware processor of a computing device, comprising the step of the first hardware processor decrypting at least one message using any method that produces a value equivalent to as $M=C^d \mod p$, where p is a not a squareful number and d is generated by calculating d such that the equation $e*d=1 \mod (p-1)$ is satisfied.

24. A computer-based method for establishing cryptographic communications over a communications network utilizing at least two computing devices, each having a hardware processor, comprising the steps of:
 the first of the hardware processors calculating a composite number N, which is formed from the product of unraised distinct prime numbers S alone, $p_1, \ldots p_k$ where $k \geq 1$, wherein N is not a squareful number;
 the second one of the hardware processors encoding a plaintext message M, to a ciphertext C, where M corresponds to a number representative of a message and $0 \leq M<S$, thereby generating an exponent e; and
 the second one of the hardware processors transforming said plaintext M into said ciphertext C where C is developed using any method that produces a value equivalent to $C=M^e \mod N$, such that ciphertext C can be decrypted into plaintext M using only e and S.

25. The method of claim 24, wherein the step of generating the exponent e further includes: calculating the exponent e as a number that is relatively prime to the product of each distinct prime factor of N minus 1, $(N_1-1)\ldots(N_j-1)$ for distinct prime factors of N 1 to j, where j is the number of distinct prime factors in N.

26. The method of claim 24, wherein the step of generating the exponent e includes choosing the exponent e as a small prime number.

27. A computer-based method for decrypting encrypted messages transmitted over a network connected to at least one computing device containing a hardware processor, comprising the step of the first hardware processor decoding the ciphertext message C to the plaintext message M by transforming said ciphertext message C to plaintext M using any method that produces a value equivalent to $M=C^d \mod S$, where S is a not a squareful number and d is generated such that $e*d=1 \mod(S-1)$.

28. A computer-based system for encrypting and decrypting electronic communications including a network of computing devices each having hardware processors, comprised of the at least first hardware processor is capable of generating at least one private key and at least one public key, wherein the at least one private key is determined based upon any one of a multiplicity of prime numbers that when unraised and multiplied together alone produce N, which is the modulus for at least one of the public keys, and wherein the modulus N is not a squareful number.

29. A computer-based method for public key decryption of at least one message transmitted over a network to at least two computing devices each having a hardware processor, comprising the steps of:
the first hardware processor decrypting a ciphertext message C into a plaintext message M using less than all of the distinct prime factors of a number N; and
the first hardware processor having received the ciphertext message C whose public key {e, N} encryption was performed by the second hardware processor using any method that produces a value equivalent to $C=Me \mod N$ and N is not a squareful number.

30. A computer-based method for public key encryption of at least one message being transmitted from a computing device having a hardware processor, said method including the steps of:
the first hardware processor creating a public key {e, N} being capable of encrypting a plaintext message M into a ciphertext message C; and
wherein the first hardware processor uses any encryption method that produces a value equivalent to $C=M^e \mod (N*X)$, where N is the public modulus, N is not a squareful number, and X is any integer greater than 1.

31. A computer-based method for public key decryption of at least one message transmitted over a data communication system by at least one computing device having a hardware processor, said method including the steps of:
the at least one message being encrypted using the public key {e, N};
the computing device receiving the at least one message; and
the first hardware processor decrypting a ciphertext message C into a plaintext message M using any method that produces a value equivalent to $M=C^d \mod N_d$, where $N_d$ is the product of less than all of the prime factors of the public modulus N and d satisfies the equation $e*d=1 \mod Z$, where Z is the product of each of the k prime factors of $N_d$ minus 1, $(p_1-1)* \ldots (p_k-1)$, and wherein the modulus N is not a squareful number and is the product of the unraised prime factors alone.

32. A computer-based method for public key decryption being provided by a first hardware processor of a first computing device, wherein said method includes the steps of:
the first computing device receiving at least one message on a communications network, wherein said message was encrypted by a second computing device having a second hardware processor using any method that produces a value equivalent to $C=M^e \mod N$; and
the first hardware processor of the first computing device decrypting a ciphertext message C into a plaintext message M using any method that produces a value equivalent to $M=C^d \mod N_d$, where $N_d$ is the product of less than all of the prime factors of the public modulus N and d satisfies the equation $e*d=1 \mod Z$, where Z is the product of each of the k prime factors of $N_k$ minus 1, $(p_1-1)* \ldots (p_k-1)$ and where the modulus N is not a squareful number and is the product of the unraised prime factors alone.

* * * * *